(12) United States Patent
Kim et al.

(10) Patent No.: US 9,131,038 B2
(45) Date of Patent: Sep. 8, 2015

(54) PORTABLE COMMUNICATION DEVICE

(75) Inventors: Dong-Hak Kim, Gyeonggi-do (KR);
Chan-Seob Park, Gyeonggi-do (KR);
Dong-Il Lee, Gyeonggi-do (KR)

(73) Assignee: Samsung Electronics Co., Ltd.,
Yeongtong-gu, Suwon-si, Gyeonggi-do
(KR)

( * ) Notice: Subject to any disclaimer, the term of this patent is extended or adjusted under 35 U.S.C. 154(b) by 76 days.

(21) Appl. No.: 13/546,390

(22) Filed: Jul. 11, 2012

(65) Prior Publication Data

US 2013/0016464 A1 Jan. 17, 2013

(30) Foreign Application Priority Data

Jul. 13, 2011 (KR) .................. 10-2011-0069651

(51) Int. Cl.
*H04M 1/02* (2006.01)

(52) U.S. Cl.
CPC .................... *H04M 1/0262* (2013.01)

(58) Field of Classification Search
CPC ............ H05K 5/02; H05K 7/00; H05K 5/00; H04M 1/00; H01M 2/02
USPC ............ 361/679.01, 679.39, 679.42–679.44, 361/679.57–679.58; 455/575.1; 429/177, 429/97
See application file for complete search history.

(56) References Cited

U.S. PATENT DOCUMENTS

| 5,535,437 | A | * | 7/1996 | Karl et al. .................. 455/575.1 |
| 7,970,444 | B2 | * | 6/2011 | Thornton et al. ........... 455/575.4 |
| 2005/0054397 | A1 | * | 3/2005 | Kim et al. .................. 455/575.4 |
| 2005/0096105 | A1 | * | 5/2005 | Ju .............................. 455/575.1 |
| 2006/0148538 | A1 | * | 7/2006 | Ni et al. ..................... 455/575.1 |
| 2007/0024233 | A1 | * | 2/2007 | Ekchian et al. ............... 320/101 |
| 2007/0218961 | A1 | * | 9/2007 | Luo et al. .................... 455/575.1 |
| 2009/0263713 | A1 | * | 10/2009 | Shi et al. ........................ 429/177 |
| 2010/0079933 | A1 | * | 4/2010 | Liang et al. ............... 361/679.01 |
| 2010/0124697 | A1 | 5/2010 | Chen et al. |
| 2011/0007455 | A1 | * | 1/2011 | Yang ........................ 361/679.01 |
| 2011/0110022 | A1 | * | 5/2011 | Kumagai et al. .......... 361/679.01 |

FOREIGN PATENT DOCUMENTS

| EP | 0685894 A1 | 12/1995 |
| KR | 10-2009-0050837 A | 5/2009 |
| WO | 2008/060057 A1 | 5/2008 |

* cited by examiner

*Primary Examiner* — Zachary M Pape
*Assistant Examiner* — Douglas Burtner
(74) *Attorney, Agent, or Firm* — Cha & Reiter, LLC.

(57) ABSTRACT

A portable communication device includes a body including at least one part attaching/detaching section, a case slidably coupled to the body to open or close the part attaching/detaching section as the case slides, a sliding module installed between the body and the case to slide the case and a locking unit installed in the body and the case. The case is slid to open or close the entire part attaching/detaching section. The part attaching/detaching section may embody any of a battery attaching/detaching section, a memory card attaching/detaching section and a plurality of connecting jacks, without limitation.

19 Claims, 17 Drawing Sheets

PORTABLE COMMUNICATION DEVICE

CLAIM OF PRIORITY

This application claims priority under 35 U.S.C. §119(a) to a Korean Patent Application entitled "Portable Communication Device" filed in the Korean Intellectual Property Office on Jul. 13, 2011, and assigned Serial No. 10-2011-0069651, the contents of which are incorporated herein by reference.

BACKGROUND OF THE INVENTION

1. Field of the Invention

The present invention relates to a portable communication device, and more particularly to a portable communication device adapted to open and close a part attaching/detaching section as a case slides.

2. Description of the Related Art

In general, a portable communication device refers to a device though which a user can perform wireless communication with a counterpart while carrying it. Such portable communication devices include an HHP, a CT-2 cellular phone, a digital phone, a PCS phone, and a PDA, and are classified into various types according to their appearances. For example, wireless terminals are classified into a bar type, a flip type, a folder type, and a slide type according to their appearances. The above-listed conventional communication devices essentially include an antenna unit, a data input/output unit, and a data transmitting/receiving unit. It is apparent that a keypad and a touch screen through which data can be input by a pushing operation of a finger are generally used as the data input unit.

As illustrated in FIG. 1, a conventional bar type portable communication unit 1 includes a front case (not shown), a rear case 2, a battery cover 3, and a battery attaching/detaching section 4.

As illustrated in FIG. 1, the battery cover 3 is detachably coupled to the rear case 2, and the rear case 2 opens or closes the battery attaching/detaching section 4 provided in the bar type portable communication unit 1 when the battery cover 3 is attached or detached.

A battery cover attaching apparatus of a portable communication device is disclosed in Korean Patent Application Publication No. 2009-0050837 (published on May 20, 2009).

However, according to the conventional bar type communication device, since a battery cover separately installed in the rear case should be separated to open or close a battery attaching/detaching section, manufacturing costs are increased and an assembling process becomes difficult due to an increase in the number of parts of the product. Further, it is difficult to make a design of a product appealing.

Thus, there exists a need to open or close a battery attaching/detaching section without using a conventional battery cover.

SUMMARY OF THE INVENTION

Accordingly, the present invention overcomes the above-mentioned problems occurring in the prior art.

The present invention provides a portable communication device adapted to open or close a part attaching/detaching section (for example, a battery attaching/detaching section, a memory card attaching/detaching section, and a plurality of connecting jacks) as a case slides. Not only does such an outer design realize a very appealing product by elimination of a need for a conventional battery cover but further realizes reduced manufacturing costs by reducing the number of parts of the product.

In one embodiment, the invention provides a portable communication device comprising: a body including at least one part attaching/detaching section; a case slidably coupled to the body to open or close the part attaching/detaching section as the case slides; a sliding module installed between the body and the case to slide the case; and a locking unit installed in the body and the case, wherein the case is slid to open or close the entire part attaching/detaching section.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Figure 1:
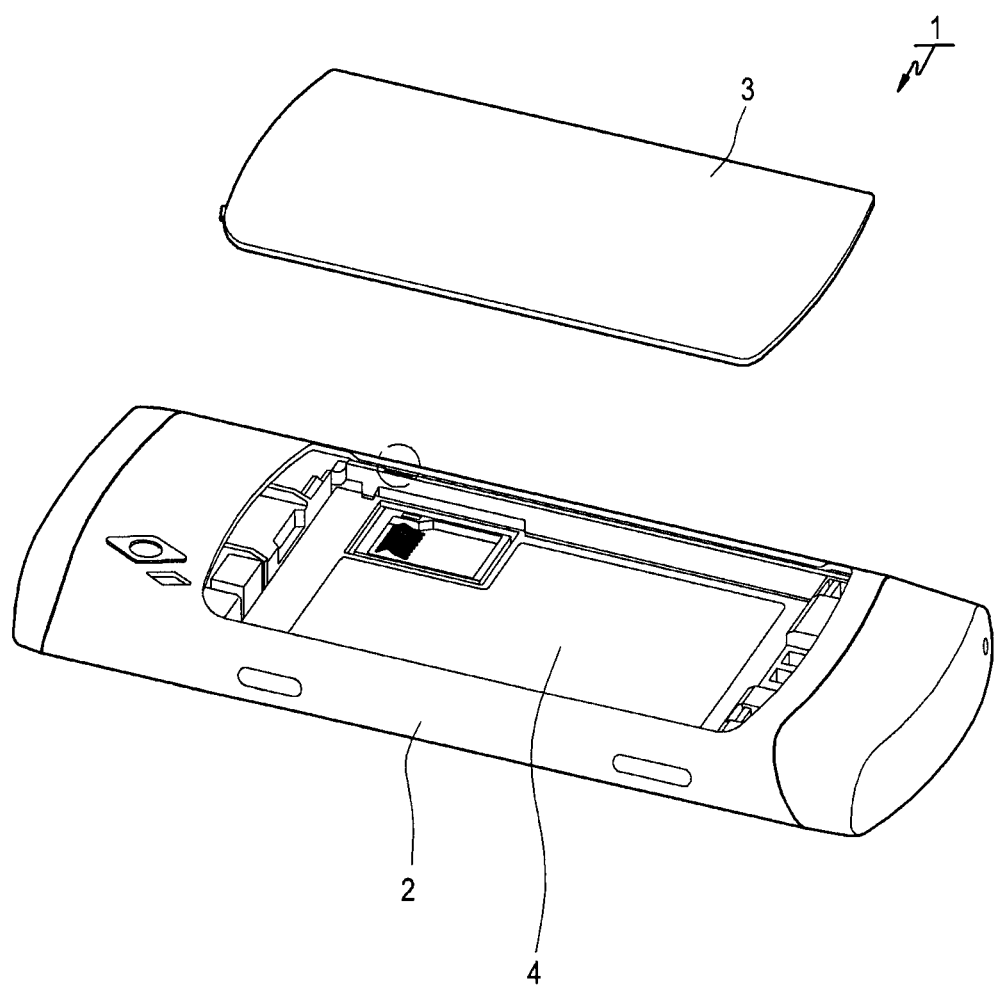
FIG. 1 is an exploded perspective view illustrating a battery cover apparatus of a conventional portable communication device.

Hereinafter, exemplary embodiments of the present invention will be described in detail with reference to the accompanying drawings. It should be understood that the configurations described herein and illustrated in the drawings are merely exemplary embodiments of the invention provided for explanatory purposes and are not meant to limit the scope and spirit in any way.

As illustrated in FIGS. 2 to 17, a portable communication device 10 includes a body 20 having a part attaching/detaching section 20a, a case 30, a sliding module 40, a locking unit 50, and at least one stopper 60. The body 20 is installed within the case 30 to open or close the part attaching/detaching section 20a as the case 30 slides. The case 30 is slidably coupled to the body 20 to open or close the part attaching/detaching section 20a as the case 30 slides. The sliding module 40 is installed between the body 20 and the case 30 to slide the case 30 from the body 20. The locking unit 50 is installed in the body 20 and the case 30 to catch or release the case 30. The stopper 60 is installed in the body 20 and the case 30 to restrict the sliding of the case 30.

The case 30 is configured to fully open the entire part attaching/detaching section 20a having at least one part.

The part attaching/detaching section 20a may be one of a battery attaching/detaching section, a memory card attaching/detaching section, and a plurality of connecting jacks, but may be any suitable part attaching/detaching section other than a battery attaching/detaching section, a memory card attaching/detaching section, and a plurality of connecting jacks.

Figure 2:
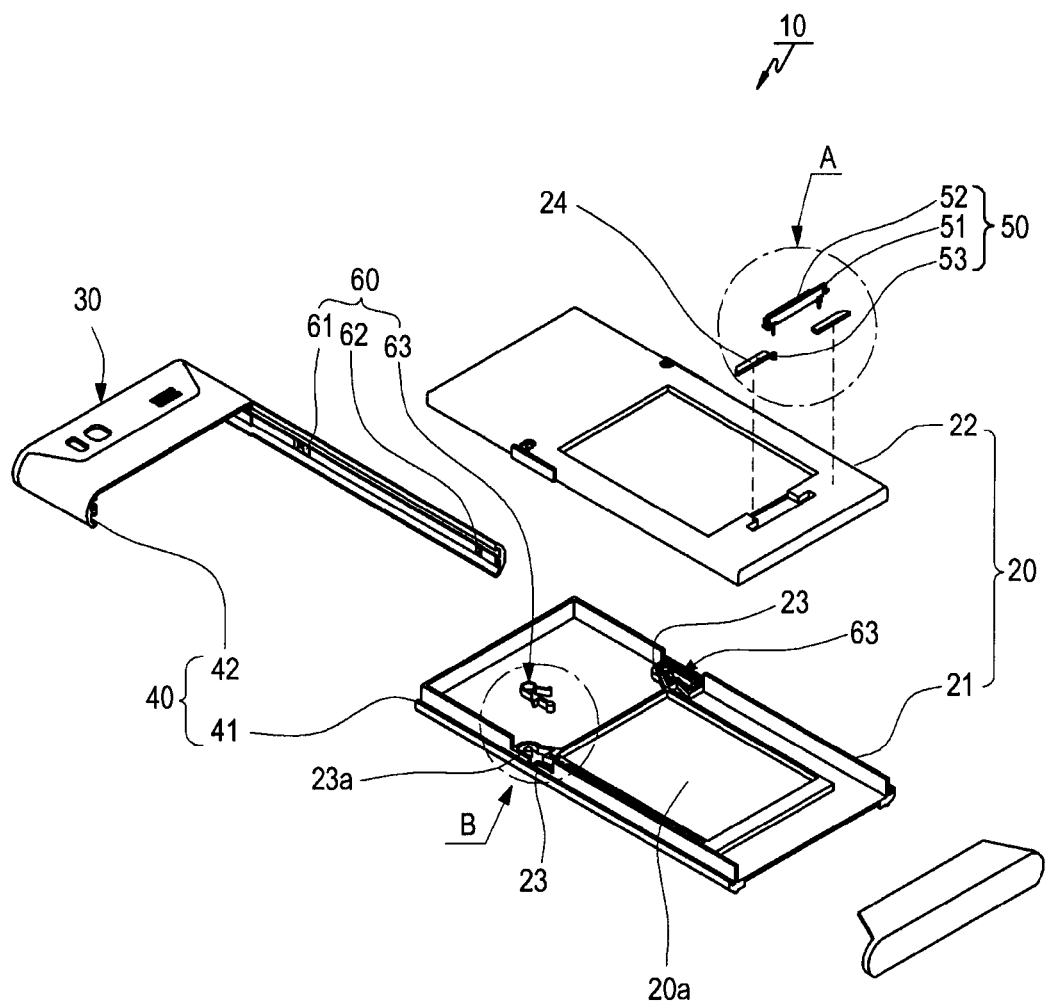
FIG. 2 is an exploded perspective view illustrating a portable communication device according to an embodiment of the present invention.
Figure 3:
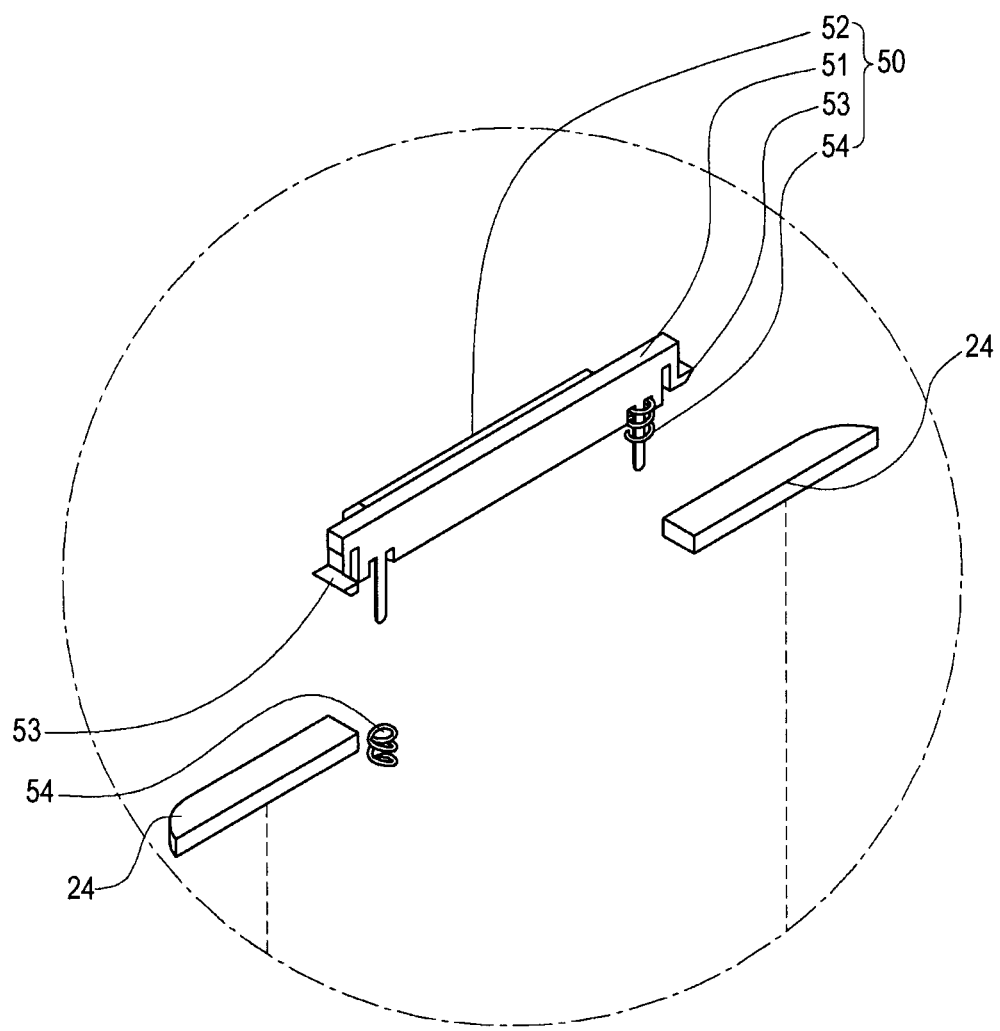
FIG. 3 is an enlarged exploded perspective view of a portion A of FIG. 2.
Figure 4:
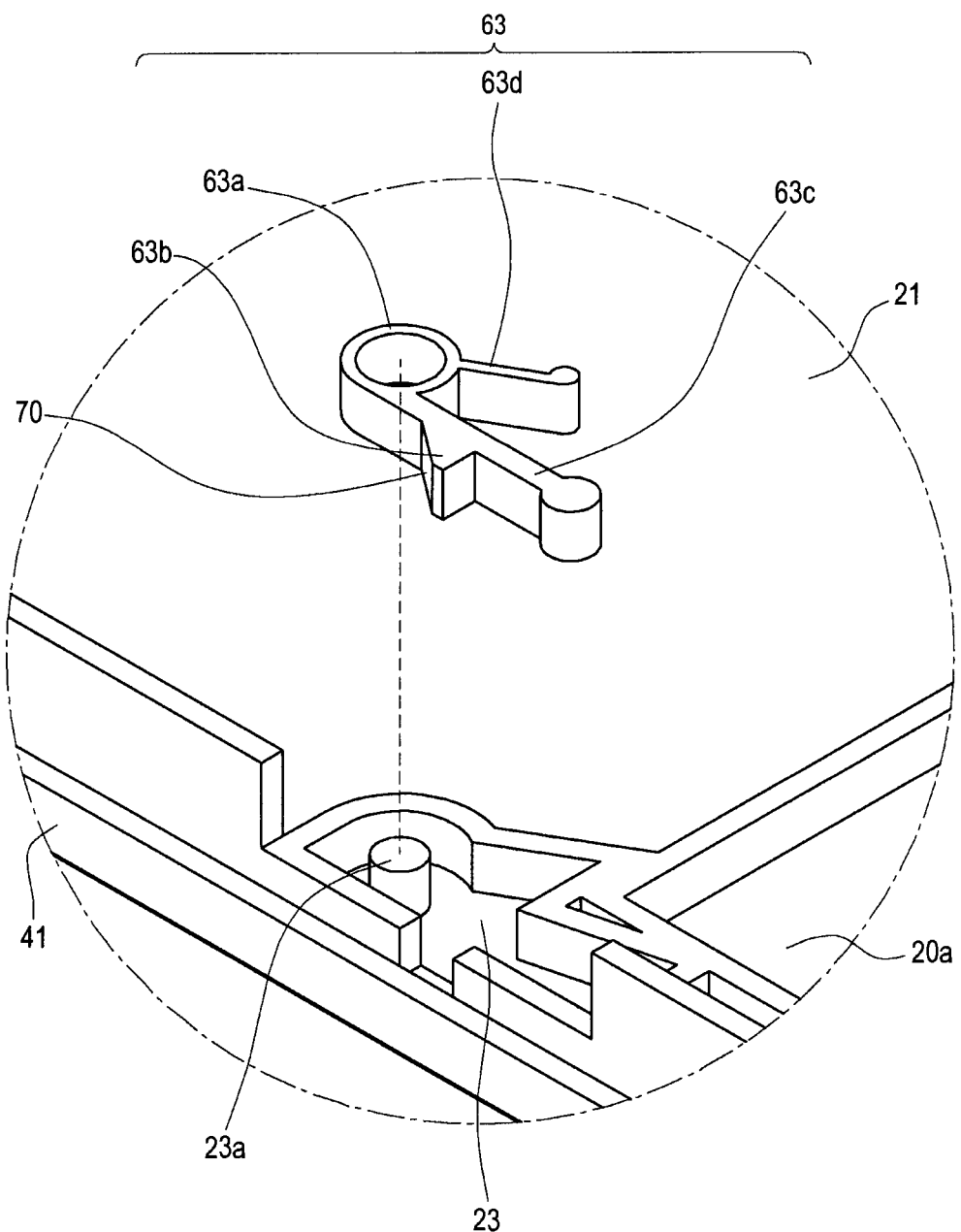
FIG. 4 is an enlarged exploded perspective view of a portion B of FIG. 2.

As illustrated in FIGS. 2 to 4, the body 20 includes first and second body elements 21 and 22. The first body element 21 is coupled to the second body element 22 to include the locking unit 50, and the second body element 22 is coupled to the first body element 21 to include the stopper 60.

Figure 7:
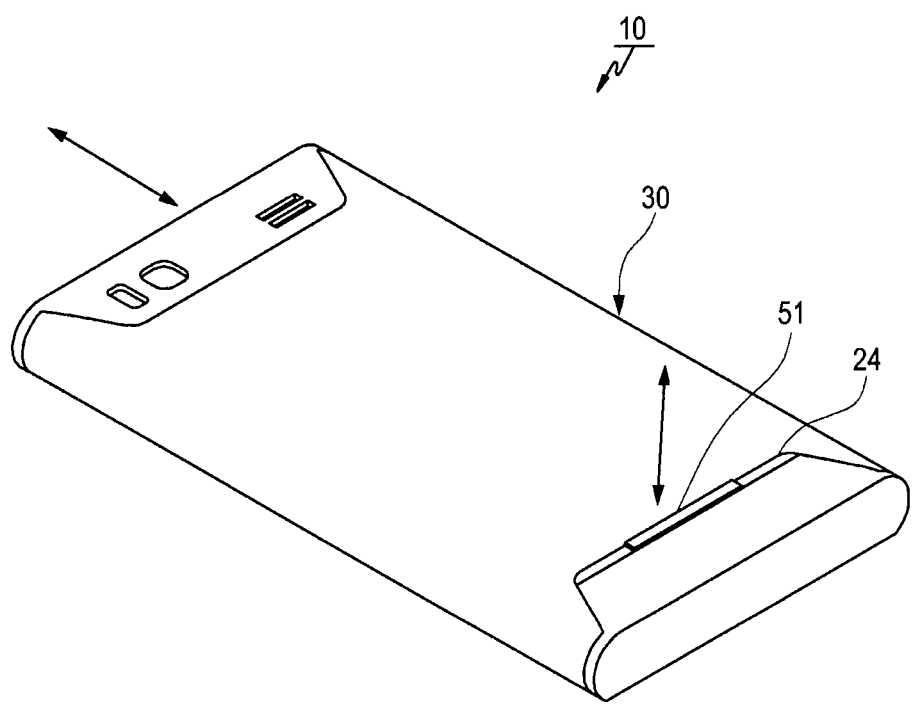
FIG. 7 is an exploded perspective view of the portable communication device in a state where the portable communication device is assembled.

As illustrated in FIGS. 2 and 7, the case 30 is a rear case made of a metal, but may be any suitable case other than the rear case (for example, an upper case).

In the embodiment shown, the case 30 is made of aluminum, but may be made of any suitable material other than aluminum (for example, stainless steel)

As illustrated in FIGS. 2 to 6, the sliding module 40 includes a pair of guide rails 41 and a pair of slide grooves 42. The guide rails 41 are installed at opposite ends of the body 20 to be slidably coupled to the slide grooves 42 and the slide grooves 42 are formed at opposite ends of the case 30 to be slidably coupled to the guide rails 41.

As illustrated in FIGS. 2 to 12, the locking unit 50 includes a button 51, a movable locker 52, a pair of hooks 53, and a pair of coil springs 54. The button 51 is installed in the body 20 to be exposed to the outside and be pushed by an external force. The movable locker 52 is installed at a lower portion of the button 51 to be caught by a catching recess 31 formed in the case 30 or released therefrom when moved upward or downward as the button 51 is pushed or the case 30 is slid. The hooks 53 are formed at opposite ends of the movable locker 52 to contact a support 24 installed in the body 20 and prevent the movable locker 52 from being separated. The coil springs 54 are installed at a lower portion of the movable locker 52 to provide resilient forces for moving the movable locker 52 upward and downward.

Figure 11:
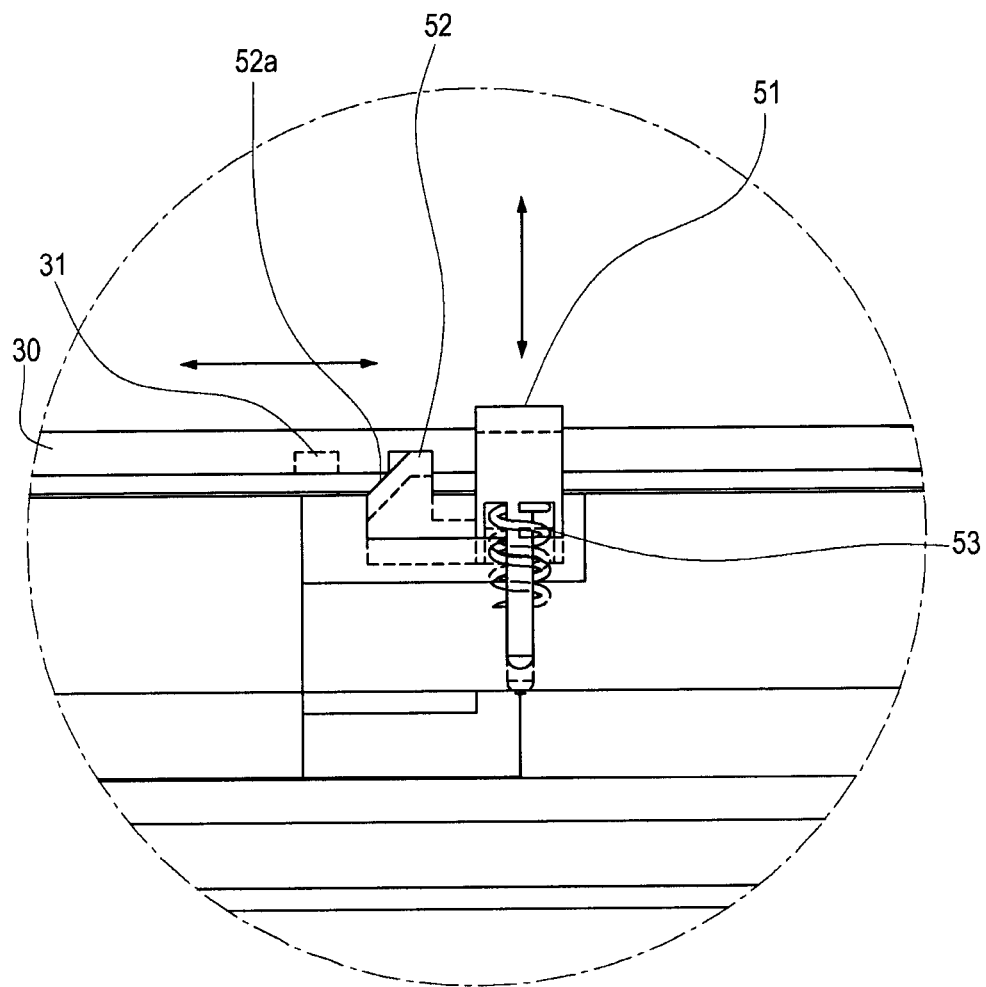
FIG. 11 is an enlarged side sectional view of a portion C of FIG. 10.

As illustrated in FIG. 11, an inclined contact surface 52a is formed in the movable locker 52 to contact the catching recess 31 of the case 30 and guide a caught state of the movable locker 52.

As illustrated in FIGS. 2, 4 to 6, and 13 to 17, the stopper 60 includes first and second stopper recesses 61 and 62, and a stopper locker 63. The first stopper recess 61 is formed in the case 30 to restrict the sliding of the case 30 at an initial position. The second stopper 62 is formed in the case 30 to restrict the sliding of the case 30 at a final position. The stopper locker 63 is installed in the body 20 to be detached from the first and second stopper recesses 61 and 62 as the case 30 slides.

As illustrated in FIGS. 4, 6 and 13 to 17, the stopper locker 63 includes a coupler 63a, a catcher 63b, a resilient member 63c, and a support member 63d. The coupler 63a is coupled to a coupling recess 23 formed in the body 20. The catcher 63b is formed at a position adjacent to the coupler 63a to be attached to and detached from the first and second stopper recesses 61 and 62 and to be caught or released due to a deflection generated when the case 30 slides. The resilient member 63c is formed in the catcher 63b to provide a resilient force for the deflection of the catcher 63b. The support member 63d is formed in the coupler 63a to support the deflection of the catcher 63b.

As illustrated in FIG. 4, the coupler 63a has a coupling hole to be coupled to a coupling boss 23a formed in the coupling recess 23 of the body 20.

As illustrated in FIGS. 14 to 17, inclined guide surfaces 61a and 62a are formed in the first and second stopper recesses 61 and 62 to detachably guide the catcher 63b of the stopper locker 63 as the case 30 slides, and an inclined surface 70 is formed in the catcher 63b to face the inclined guide surfaces 61a and 62a and guide attachment and detachment of the inclined guide surfaces 61a and 62a.

As illustrated in FIGS. 2 to 17, the portable communication device 10 includes a body 20 having a part attaching/detaching section 20a, a case 30, a sliding module 40, a locking unit 50, and at least one stopper 60.

The part attaching/detaching section 20a may be exemplified by a battery attaching/detaching section, as described hereinbelow.

The case 30 is a rear case made of aluminum.

Figure 5:
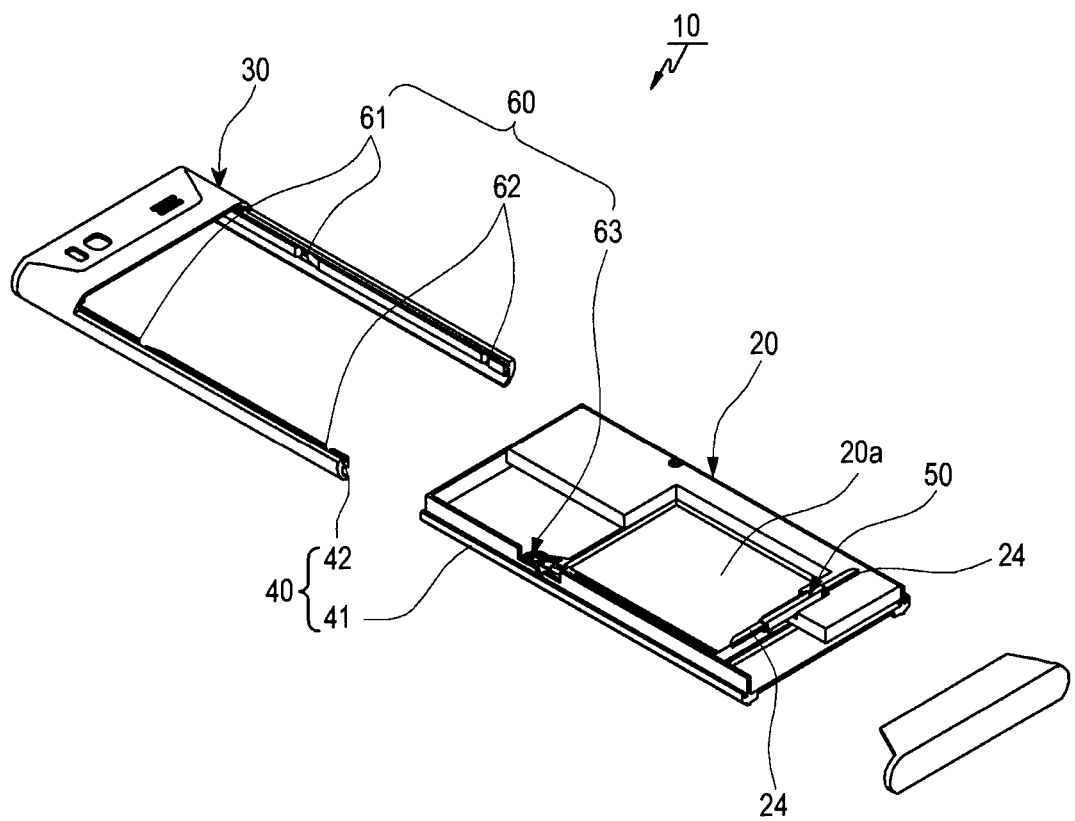
FIG. 5 is an exploded perspective view of the portable communication device in an unassembled state.
Figure 6:
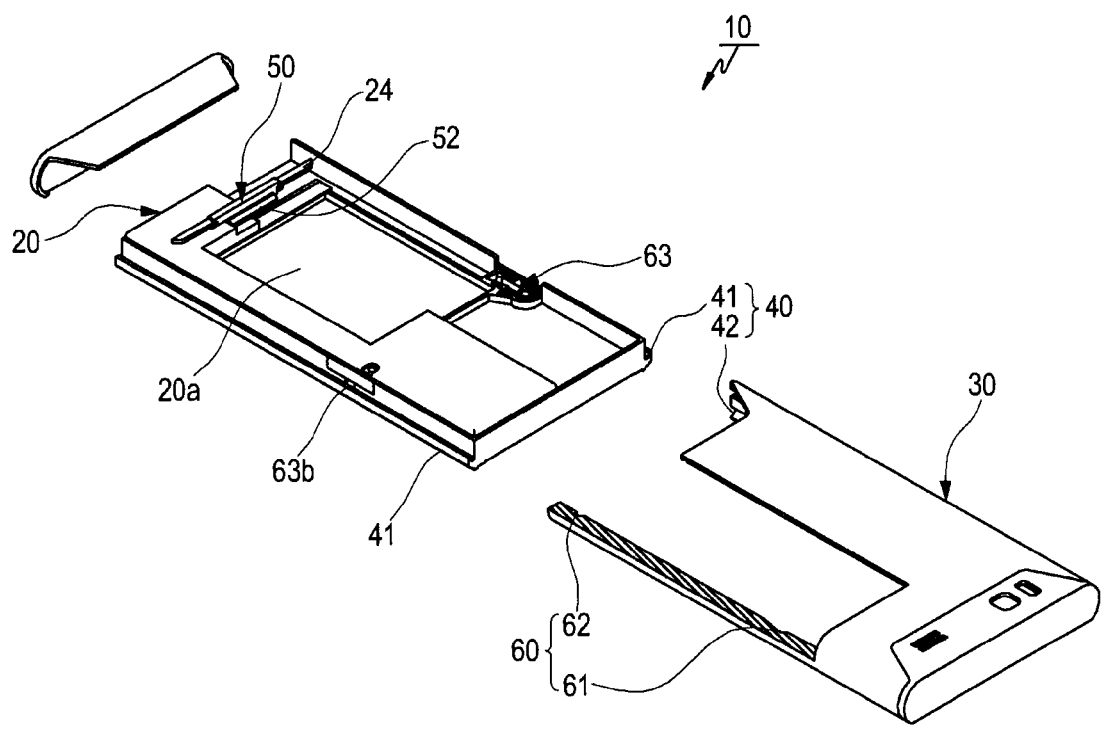
FIG. 6 is an exploded perspective view of the portable communication device in a state where a stopper is coupled to a body.

As illustrated in FIGS. 2, 5, and 6, the sliding module 40 includes a pair of guide rails 41 and a pair of slide grooves 42.

As illustrated in FIGS. 2 and 3, the locking unit 50 includes a button 51, a movable locker 52, a pair of hooks 53, and a pair of coil springs 54.

As illustrated in FIGS. 2, 3, and 9 to 12, the body 20 includes first and second body elements 21 and 22. The locking unit 50 is installed in the first body element 21, and the hooks 53 contact the support 24 of the first body 21 when coupled to the support 24 of the first body 21. Each of a pair of coil springs 54 are coupled to a lower portion of the movable locker 52.

As illustrated in FIGS. 2, and 13 to 17, the stopper 60 includes first and second stopper recesses 61 and 62, and a stopper locker 63. The stopper locker 63 is coupled to a couple recess 23 formed in the second body element 22.

In this state, as illustrated in FIGS. 2 to 8, the first and second body elements 21 and 22 are coupled to each other, and a pair of guide rails 41 installed at opposite ends of the second body element 22 is slidably coupled to a pair of slide grooves 42 formed at opposite ends of the case 30.

Figure 8:
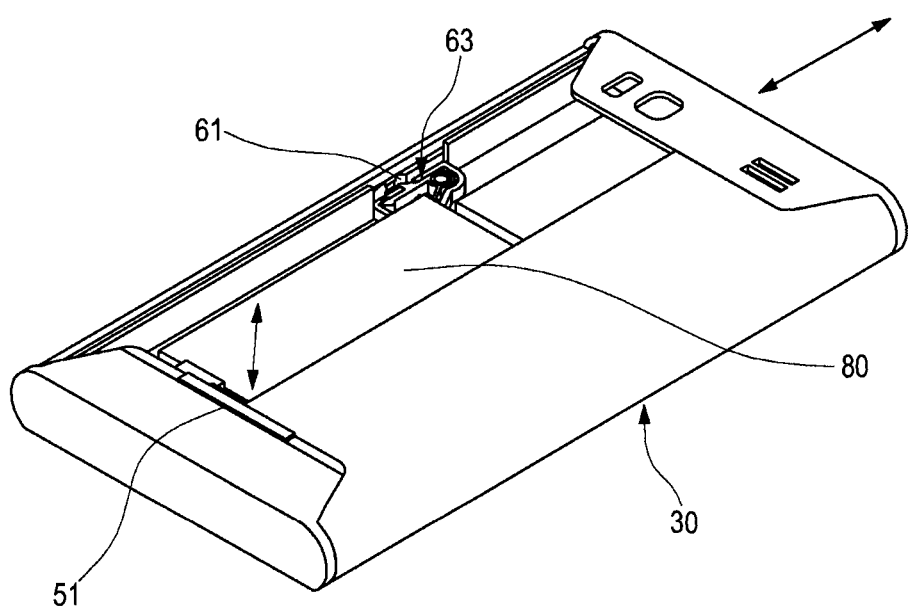
FIG. 8 is a cutaway perspective view illustrating a state where the portable communication device is not yet operated.
Figure 9:
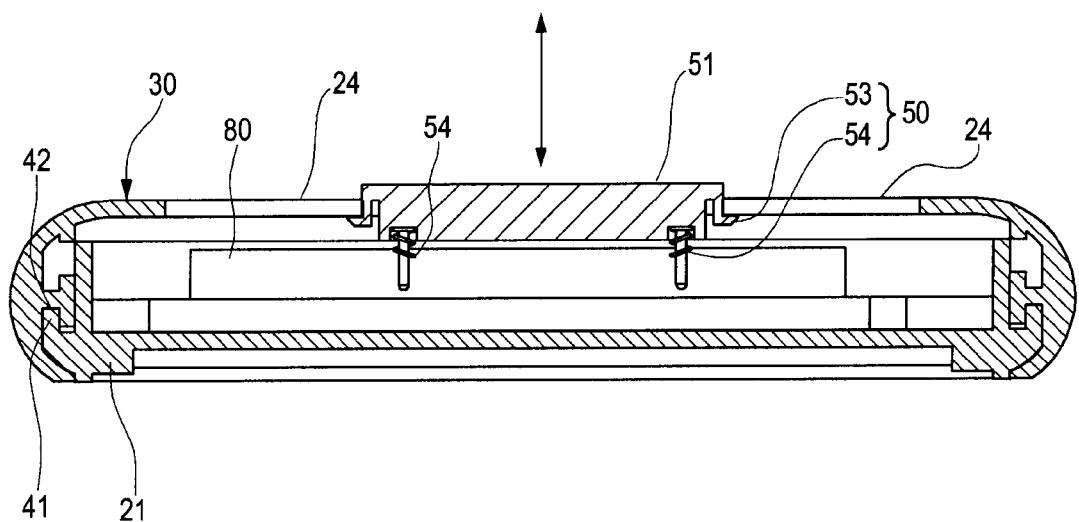
FIG. 9 is a side sectional view illustrating a locking unit of the portable communication device.

In this state, as illustrated in FIGS. 7 and 8, when a user is to attach a battery pack 80 installed in the body 20, the user pushes a button 51 of the locking unit 50 formed in the first body element 21 first.

Figure 10:
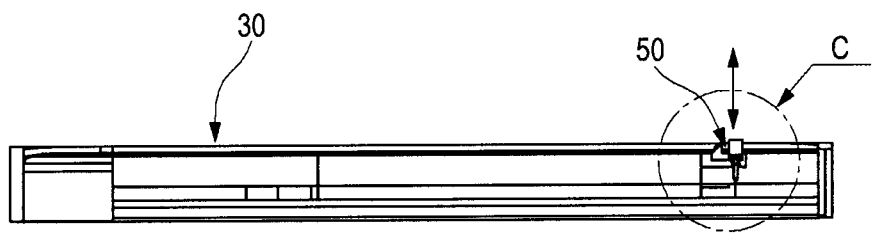
FIG. 10 is a side sectional view illustrating a state where the portable communication device is not yet operated.
Figure 12:
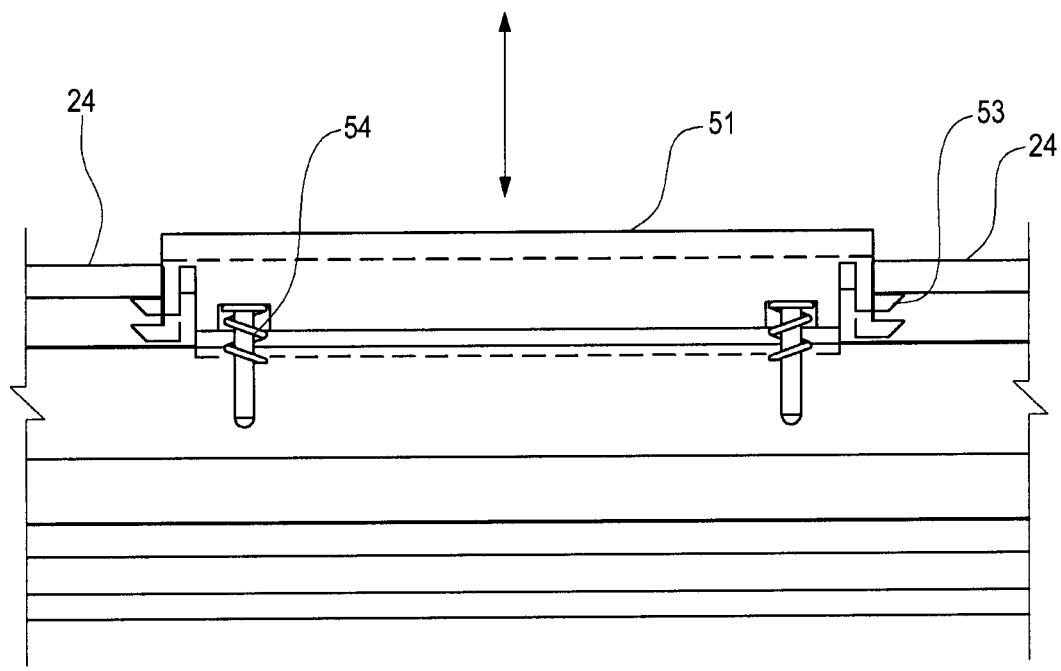
FIG. 12 is a view illustrating a state where the locking unit of the portable communication device is operated.

Then, as illustrated in FIGS. 10 to 12, the button 51 is moved from the upper side to the lower side and the movable locker 52 is moved together. The movable locker 52 is released when separated from the catching recess 31 formed in the case 30, and the movable locker 52 is moved to an original position again from the lower side to the upper side by a coil spring 54 installed at a lower portion of the movable locker 52.

Then, as illustrated in FIGS. 9 to 12, the hooks 53 formed at opposite ends of the movable locker 52 contact a support 24 installed in the first body element 21 and prevent separation of the movable locker 52 at the same time.

Figure 15:
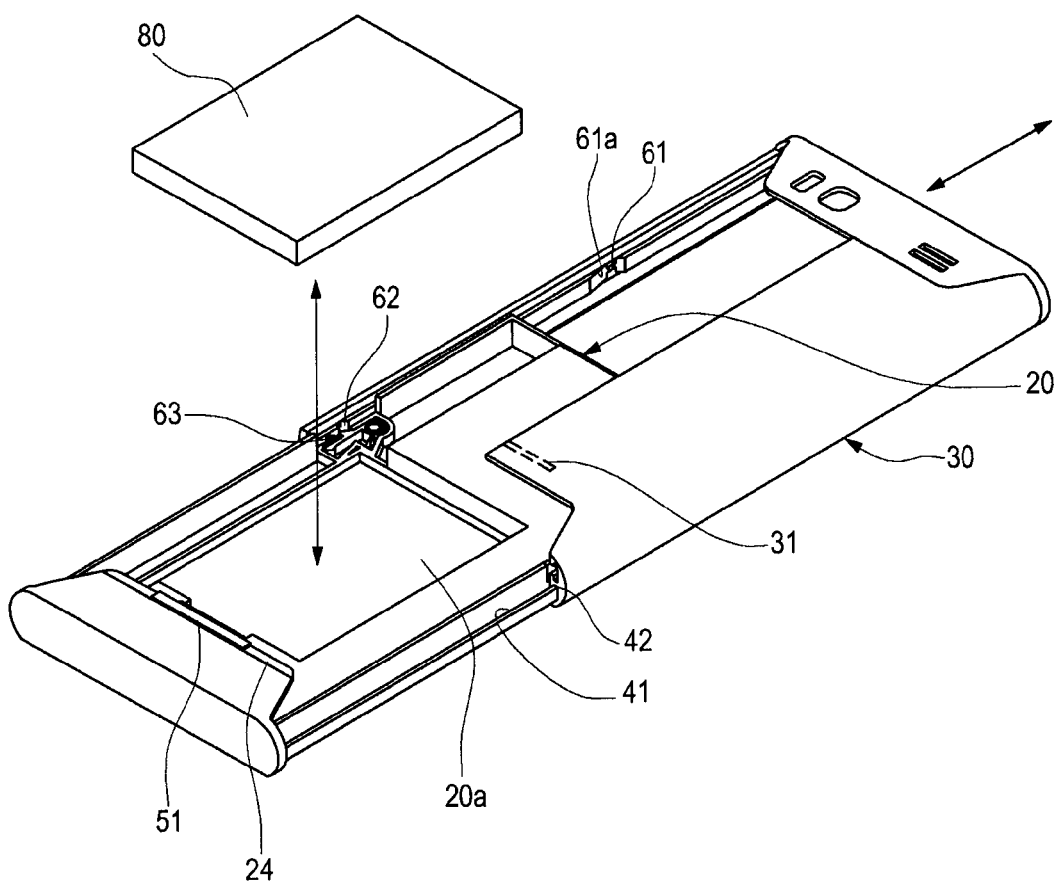
FIG. 15 is a cutaway perspective view illustrating a state where the portable communication device is operated.
Figure 16:
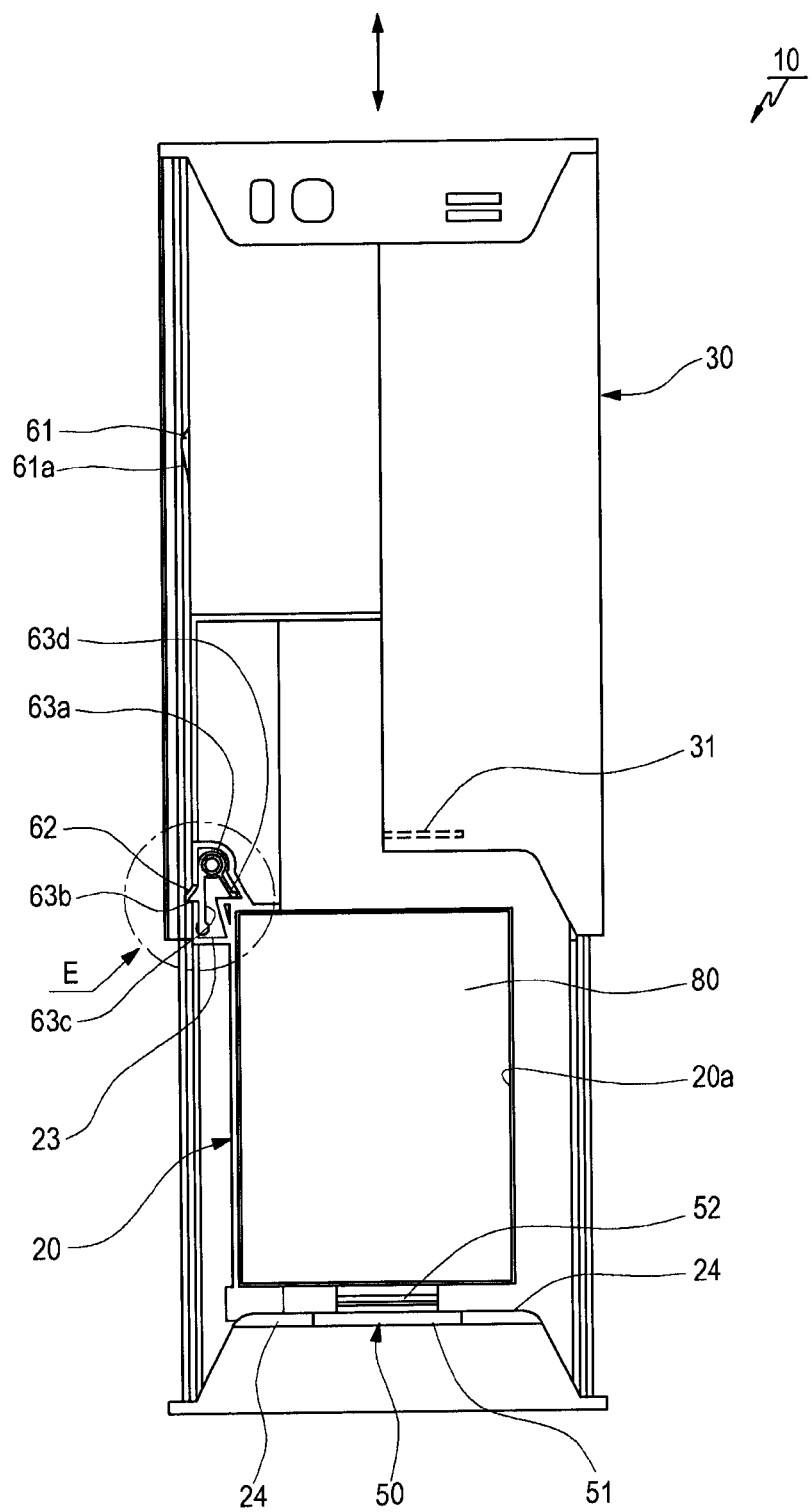
FIG. 16 is a cutaway plan view illustrating a state where the portable communication device is operated.

In this state, as illustrated in FIGS. 15 and 16, the case 30 is slid from the body 20.

Figure 13:
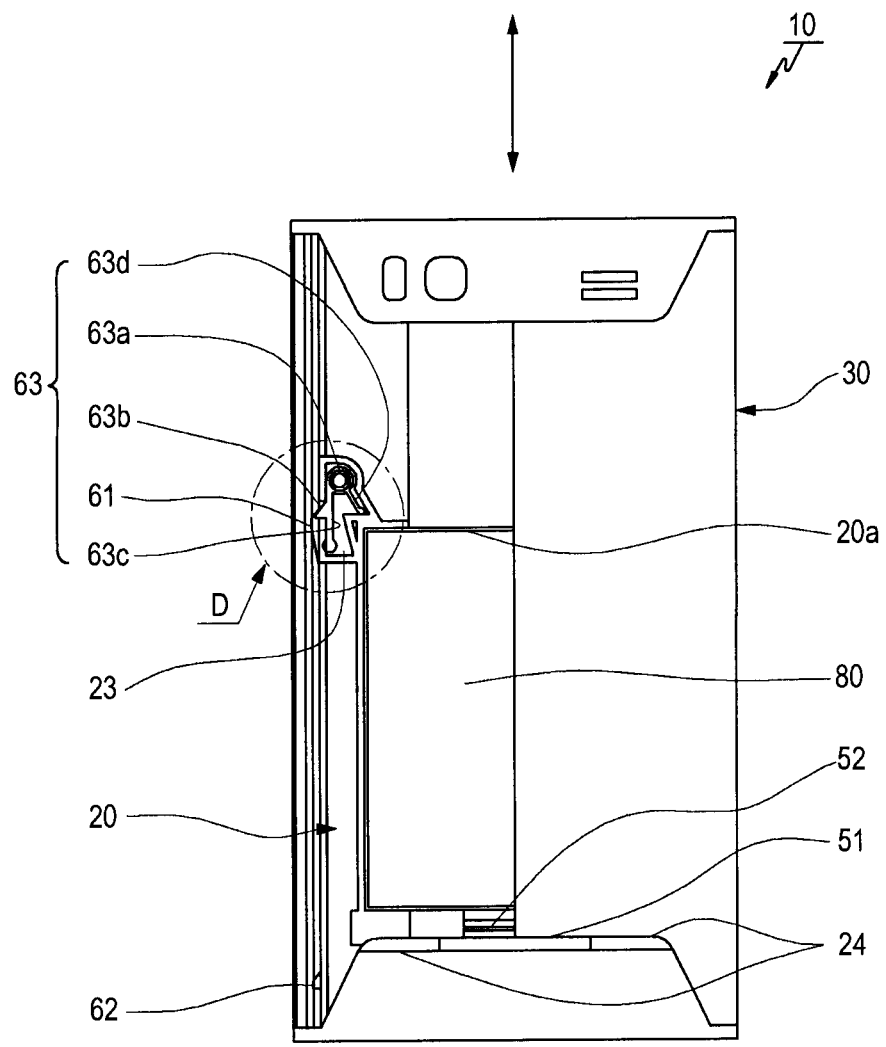
FIG. 13 is a cutaway plan view illustrating a state where the portable communication device is not operated yet.
Figure 14:
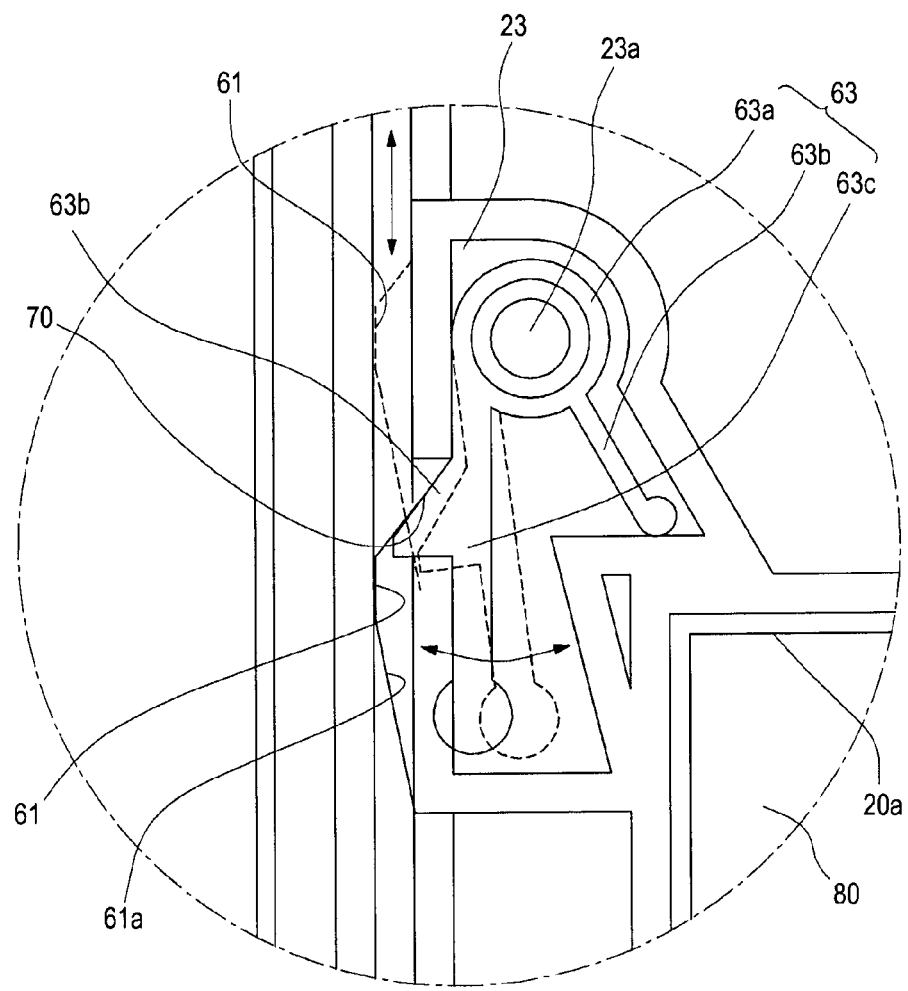
FIG. 14 is an enlarged plan view of a portion D of FIG. 13.

As illustrated in FIGS. 5, 6, and 13 to 17, the slide grooves 42 formed at opposite ends of the case 30 are slid by the guide rails 41 installed at opposite ends of the body section 20. Then, as illustrated in FIGS. 13 and 14, the first and second stopper recesses 61 and 62 formed in the case 30 are slid together, and the first stopper recess 61 is separated from a catcher 63b of the stopper locker 63. An inclined guide surface 61a formed in the first stopper recess 61 guides separation of the catcher 63b. The catcher 63b is deflected by a resilient member 63c when moved on the inclined guide surface 61a.

As illustrated in FIG. 16, the case 30 is moved from the body 20 to a slide completing position of the case 30.

Figure 17:
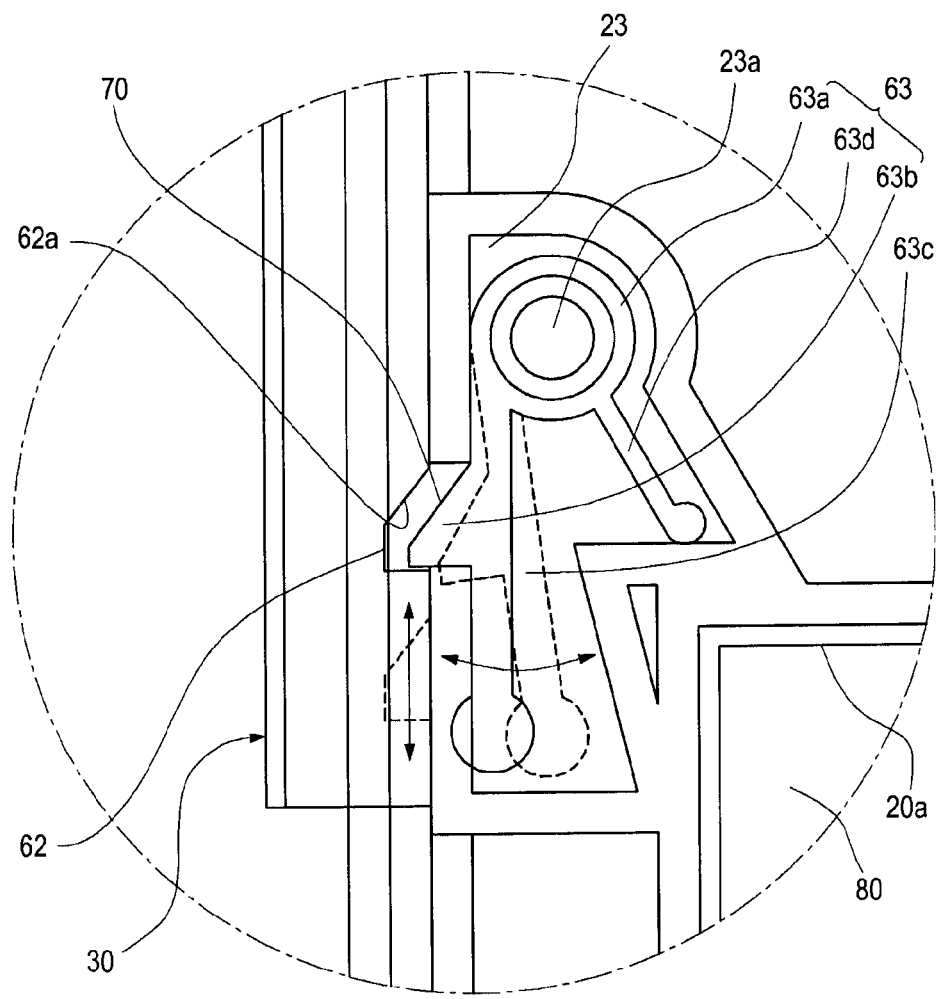
FIG. 17 is an enlarged plan view of a portion E of FIG. 16.

Then, as illustrated in FIGS. 16 and 17, the catcher 63b is inserted into and caught by the second stopper recess 62 formed in the case 30 to restrict the sliding of the case 30. Then, the deflected catcher 63b is moved to an original position again by the resilient member 63c and is inserted into the second stopper recess 62.

As illustrated in FIG. 17, the catcher 63b is guided by and inserted into the inclined guide surface 62a formed in the second stopper recess 62. Then, since an inclined surface 70 facing the inclined guide surface 62a formed in the second stopper recess 62 and guiding attachment and detachment of the inclined guide surface 62a is formed in the catcher 63b, the inclined surface 70 guides insertion of the inclined guide surface 62a and faces the inclined guide surface 62a at the same time when the catcher 63b is inserted along the inclined guide surface 62a.

Then, as illustrated in FIG. 15, the case 30 is slid from the body 20 and opens the battery attaching/detaching section 20a installed in the body 20 at the same time. In this state, a battery pack 80 mounted to the battery attaching/detaching section 20a is separated so that a new battery pack 80 can be coupled.

In this state, as illustrated in FIG. 13, the case 30 is slid again to close the battery attaching/detaching section 20a.

As illustrated in FIGS. 14 and 16, the case 30 is slid and the first and second stopper recesses 61 and 62 are moved together at the same time.

Then, as illustrated in FIG. 17, the catcher 63b is separated from the second stopper recess 62 and is deflected by the resilient member 63c.

As illustrated in FIG. 14, when the case 30 is slid to an original position again, the catcher 63b is inserted into the first stopper recess 61 again. The deflected catcher 63b is moved to an original position again by the resilient member 63c and is inserted into the first stopper recess 61. Then, since the inclined surface 70 is formed in the catcher 63b, the inclined surface 70 guides insertion of the inclined guide surface 61a and faces the inclined guide surface 61a when the catcher 63b is inserted along the inclined guide surface 61a of the first stopper recess 61.

As illustrated in FIGS. 7, 8, and 13, movement of the case 30 is restricted at an initial sliding position and the battery attaching/detaching section 20a of the body 20 is closed.

Then, as illustrated in FIGS. 10 and 11, the catching recess 31 of the case 30 contacts the movable locker 52, and is guided along a contact guide surface 52a formed in the movable locker 52 and is caught by the movable locker 52, restricting movement of the movable locker 52.

Then, the movable locker 52 is moved upward and downward while contacting the catching recess 31.

Accordingly, since the case 30 opens or closes the battery attaching/detaching section 20a installed in the body 20 when it slides along the body 20, an appealing outer product design is realized without need for a conventional battery cover to open and close the battery attaching/detaching section 20a. Moreover, such design further realizes reduced manufacturing costs and reduced number of parts of the product.

It should be recognized that the above-described portable communication device is merely one embodiment of the present invention, that the invention is not limited to a mobile communication terminal. Various types of terminals may employ the present invention.

That is, the portable communication device of the invention may include without limitation any mobile communication terminals operated based on any known or developing communication protocols, all information and communication devices including without limitation portable multimedia players (PMPs), MP3 players, navigation systems, gaming devices, laptop computers, advertising panels, TVs, digital broadcasting players, personal digital assistants (PDAs), smart phones, electronic devices and multimedia devices, and application devices thereof.

While the invention has been shown and described with reference to a certain embodiment thereof, it should be understood by those skilled in the art that various changes in form and details may be made therein without departing from the spirit and scope of the invention as defined by the appended claims.

What is claimed is:

1. A portable communication device, comprising:
    a body including a part attaching/detaching section, the body having a length and lateral sides;
    a case slidably coupled to the body along substantially an entire length thereof, wherein sliding of the case relative to the body in a first direction opens the part attaching/detaching section and sliding of the case relative to the body in a second direction closes the part attaching/detaching section, and wherein an exterior surface of the case forms a majority portion of an exterior surface of the portable communication device;
    a sliding module installed outside the attaching/detaching section between the case and the lateral sides of the body to slide the case;
    a locking unit installed in the body and the case, the case and the body remaining slidably coupled to one another when the part attaching/detaching section is open; and
    a stopper to restrict the sliding of the case, disposed proximate one of the lateral sides of the body, the stopper comprising a stopper recess and a stopper locker, the stopper locker comprising:
        a circular coupler coupled to a coupling recess formed in the body;
        a first arm extending from the coupler in a first radial direction and having a catcher that deflects when the case slides and that becomes retained within the stopper recess, and a resilient member to provide a resilient force; and
        a second arm extending in a second radial direction and serving as a support member to support deflection of the catcher.

2. The portable communication device as claimed in claim 1, wherein the part attaching/detaching section is one of a battery attaching/detaching section, a memory card attaching/detaching section and a plurality of connecting jacks.

3. The portable communication device as claimed in claim 1, wherein the stopper is a first stopper, and further comprising a second stopper disposed proximate an opposite one of the lateral sides of the body.

4. The portable communication device as claimed in claim 1, wherein the body includes a first body element having the locking unit and a second body element having the stopper.

5. The portable communication device as claimed in claim 1, wherein the case includes a rear case made of a metal.

6. The portable communication device as claimed in claim 1, wherein the case is made of aluminum.

7. The portable communication device as claimed in claim 1, wherein the sliding module includes a pair of guide rails installed at opposite sides of the body and a pair of slide grooves formed at opposite sides of the case and is slidably coupled to the guide rails.

8. The portable communication device as claimed in claim 1, wherein the locking unit includes:
   a button installed in the body and exposed to the outside;
   a movable locker installed at a lower portion of the button and configured to be caught by or released from a catching recess formed in the case when the button is pushed or the movable locker is moved upward and downward as the case slides;
   a pair of hooks formed at opposite ends of the movable locker to contact a support installed in the body and prevent separation of the movable locker; and
   a pair of coil springs installed at a lower portion of the movable locker to provide a resilient force to allow upward and downward movement of the movable locker.

9. The portable communication device as claimed in claim 8, wherein the movable locker forms an inclined contact surface which contacts the catching recess of the case and guides the catching of the catching recess.

10. The portable communication device as claimed in claim 1, wherein the stopper recess is a first stopper recess that restricts sliding of the case at a final position when the catcher of the stopper locker is caught therein, and the stopper further includes a second stopper recess that restricts the sliding of the case at an initial position.

11. The portable communication device as claimed in claim 1, wherein the coupler has a coupling hole coupled to a coupling boss formed in the coupling recess.

12. The portable communication device as claimed in claim 10, wherein an inclined guide surface is formed in each of the first and second stopper recesses to detachably guide the catcher of the stopper locker.

13. The portable communication device as claimed in claim 12, wherein an inclined surface is formed in the catcher to face the inclined guide surface and guide attachment and detachment of the inclined guide surface.

14. A portable communication device comprising:
   a body including a part attaching/detaching section, the body including a distal end; and
   a case in combination with a sliding module that is slidably coupled to the body, the sliding module being installed outside the attaching/detaching section between the case and lateral sides of the body to slide the case,
   the case, sliding module and body cooperating to open or close the part attaching/detaching section as the case slides, and the part attaching/detaching section ejects from the distal end of the case when being opened; and
   a stopper to restrict the sliding of the case, disposed proximate one of the lateral sides of the body, the stopper comprising a stopper recess and a stopper locker, the stopper locker comprising:
   a circular coupler coupled to a coupling recess formed in the body;
   a first arm extending from the coupler in a first radial direction and having a catcher that deflects when the case slides and that becomes retained within the stopper recess, and a resilient member to provide a resilient force; and
   a second arm extending in a second radial direction and serving as a support member to support deflection of the catcher.

15. The portable communication device as claimed in claim 14, wherein the part attaching/detaching section embodies one of a battery attaching/detaching section, a memory card attaching/detaching section and a plurality of connecting jacks.

16. The portable communication device as claimed in claim 14, wherein the sliding module includes a pair of guide rails installed at opposite sides of the body and a pair of slide grooves formed at opposite sides of the case and is slidably coupled to the guide rails.

17. A portable communication device comprising:
   a portable communication device body including a battery attaching/detaching section;
   a case slidably coupled to the body to open or close the battery attaching/detaching section as the case slides;
   a sliding module installed outside the attaching/detaching section at opposite lateral sides of the body between the body and the case to slide the case;
   a locking unit installed in the body and the case to catch and release the case; and
   a stopper installed in the body and the case to restrict sliding of the case, disposed proximate one of the lateral sides of the body, the stopper comprising a stopper recess and a stopper locker, the stopper locker comprising:
   a circular coupler coupled to a coupling recess formed in the body;
   a first arm extending from the coupler in a first radial direction and having a catcher that deflects when the case slides and that becomes retained within the stopper recess, and a resilient member to provide a resilient force; and
   a second arm extending in a second radial direction and serving as a support member to support deflection of the catcher.

18. The portable communication device as claimed in claim 17, wherein the stopper is a first stopper, and further comprising a second stopper disposed proximate an opposite one of the lateral sides of the body.

19. The portable communication device as claimed in claim 17, wherein the stopper recess is a first stopper recess formed in the case to restrict the sliding of the case at an initial position, the stopper further including a second stopper recess formed in the case to restrict the sliding of the case at a final position and the stopper locker is installed in the body to be detached from the first and second stopper recesses as the case slides.

* * * * *